United States Patent [19]

Simelunas

[11] Patent Number: 4,783,290

[45] Date of Patent: Nov. 8, 1988

[54] METHOD OF CHANGING DIE HEAD FOR CONVERTING A CO-EXTRUSION APPARATUS

[75] Inventor: William J. Simelunas, Glen Rock, N.J.

[73] Assignee: Nabisco Brands, Inc., Parsippany, N.J.

[21] Appl. No.: 830,638

[22] Filed: Feb. 18, 1986

Related U.S. Application Data

[62] Division of Ser. No. 738,035, May 24, 1985, abandoned.

[51] Int. Cl.4 .............................................. B29C 47/12
[52] U.S. Cl. ...................................... 264/39; 264/169; 264/171; 264/172; 264/211.11; 264/211.23; 425/132; 425/133.1; 425/225; 426/503; 426/513; 426/516
[58] Field of Search ............... 264/171, 172, 176 R, 264/211.23, 211.11, 176.1, 39, 169; 425/132, 131.1, 133, 146, 225, 241, 239; 426/513, 516, 503

[56] References Cited

U.S. PATENT DOCUMENTS

| | | | |
|---|---|---|---|
| 1,711,750 | 5/1929 | Schoppner | 425/132 |
| 1,808,788 | 6/1931 | Proos | 425/183 |
| 2,261,977 | 11/1941 | Deutsch | 425/131.1 |
| 2,620,173 | 12/1952 | White | 425/131.1 |
| 2,909,131 | 10/1959 | Baur | 425/374 |
| 3,486,195 | 12/1969 | Greenwood et al. . | |
| 3,724,985 | 4/1973 | Burlis et al. | 425/132 |
| 3,752,617 | 8/1973 | Burlis et al. . | |
| 3,924,990 | 12/1975 | Schrenk . | |
| 4,128,386 | 12/1978 | Wissinger et al. . | |
| 4,205,951 | 6/1980 | Sollich | 425/374 |
| 4,251,201 | 2/1981 | Krysiak | 425/133.1 |
| 4,411,614 | 10/1983 | Feathers . | |
| 4,445,835 | 5/1984 | Wasserbach | 264/75 |
| 4,469,475 | 9/1984 | Krysiak | 425/133.1 |
| 4,565,510 | 1/1986 | Kirjauainen | 425/113 |

FOREIGN PATENT DOCUMENTS 773404  4/1957  United Kingdom ............ 425/131.1

*Primary Examiner*—Jeffery Thurlow
*Attorney, Agent, or Firm*—Richard Kornutik

[57] ABSTRACT

In a method of operating a co-extruder, a co-extrusion die used during a co-extrusion mode of operation is replaced by a simple extrusion die which is used during a simple extrusion mode of operation. The co-extruder has a pair of juxtaposed outlets one of which is blocked by the simple extrusion die during utilization thereof.

8 Claims, 2 Drawing Sheets

METHOD OF CHANGING DIE HEAD FOR CONVERTING A CO-EXTRUSION APPARATUS

This is a division of application Ser. No. 738,035 filed May 24, 1985, now abandoned.

BACKGROUND OF THE INVENTION

This invention relates to a co-extrusion apparatus in which two dissimilar materials are simultaneously extruded from respective extruder outlets.

One kind of co-extrusion apparatus has a pair of oval outlet openings juxtaposed to one another, each outlet communicating with a respective hopper via a respective passageway extending around the outside cylindrical surface of a respective rotatable drum. The rotation of the drums transports semi-solid material from the hoppers to the outlets. For forming a rope-like co-extrudate, a co-extrusion die is fastened to the co-extrusion apparatus at the outlets thereof, the die having an inner nozzle communicating with one of the outlets and an outer nozzle surrounding the inner nozzle and communicating with the other outlet of the co-extrusion apparatus. During operation of the co-extrusion apparatus, the rope-like co-extrudate is deposited upon a horizontally moving conveyor disposed below the mouth of the extrusion die.

The above-described co-extrusion apparatus is presently being used in the manufacture of cookies having an inner core formed of one substance and an outer envelope of another substance. For example, the inner substance might be a fruit filling or a dough having particulate matter such as nuts or chocolate chips, while the outer substance is another dough with or without particulate matter.

It has been found that the demand for a kind of cookie having an inner core of one material and an outer core of another, dissimilar material is not so great in some geographical areas as to require continuous manufacture of that cookie by co-extrusion apparatuses located in those areas. Moreover, it has been found that subsequently preparing the co-extrusion apparatus for the manufacture of another cookie having dissimilar inner and outer portions, in which at least one of the portions is different from the corresponding portion in the first cookie, results in consideration production inefficiencies owing to the time required to clean the co-extrusion apparatus for the new material.

An object of the present invention is to provide a method of using a co-extrusion apparatus in which the percentage of time that the apparatus is in use is increased and in which the down time of the co-extrusion apparatus is reduced.

Another object is to provide a die head utilizable in such a method to convert a co-extrusion apparatus from a co-extrusion to a simple extrusion mode of operation.

SUMMARY OF THE INVENTION

The present invention is directed in part to an improved method for using a co-extrusion apparatus having a first hopper for containing a supply of a first material and a second hopper for containing a supply of a second material. The co-extrusion apparatus further includes a first feeding mechanism for transferring the first material from the first hopper to a first outlet of the extruder and a second feeding mechanism for transferring the second material from the second hopper to a second outlet proximate to the first outlet.

In a method according to the present invention, a co-extrusion die having an inner nozzle and an outer nozzle surrounding the inner nozzle is detachably fastened to the co-extrusion apparatus so that the inner nozzle communicates with the first outlet and the outer nozzle communicates with the second outlet. The co-extrusion apparatus is then operated in a co-extrusion mode to produce a rope-like co-extrudate having a core formed of the first material and a tube-like outer layer formed of the second material and surrounding the core. In a subsequent series of steps, the co-extrusion die is removed from the co-extrusion apparatus and a simple extrusion die with a single nozzle is removably attached to the co-extrusion apparatus so that the single nozzle communicates with one of the outlets and so that the simple extrusion die blocks the other outlet to prevent the passage of the respective material therethrough. The co-extrusion apparatus is then operated in a simple extrusion mode to produce a rope-like simple extrudate formed of a single material contained in the hopper associated with the outlet communicating with the nozzle of the simple extrusion die.

The second material located within the second hopper is preferably a dough. Upon extrusion of the rope-like co-extrudate through the co-extrusion die, the co-extrudate may be deposited on a substantially horizontal conveyor and transported to a cutting station at which the co-extrudate is formed into a sequence of cookies having an outer portion formed by the dough and an inner portion of dissimilar material. In accordance with particular features of the present invention, either the first material, the second material or both may take the form of a dough containing particulate matter such as chocolate chips or nut fragments.

In accordance with another feature of the present invention, the hopper and the feeding mechanism associated with the blocked outlet are cleaned at least in part during the operation of the co-extrusion apparatus in a simple extrusion mode.

In accordance with yet another feature of the present invention, upon operation of the co-extrusion apparatus with the simple extrusion die for a predetermined interval, that die is removed from the co-extrusion apparatus. An additional extrusion die having a single nozzle is then disconnectably coupled to the co-extrusion apparatus so that the nozzle of the additional extrusion die communicates with the previously blocked outlet of the co-extrusion apparatus and so that the outlet previously communicating with the nozzle of the simple extrusion die is blocked by the additional extrusion die. The co-extrusion apparatus is then again operated in a simple extrusion mode to produce a rope-like additional extrudate formed of a single material contained in the hopper communicating with the outlet which in turn communicates with the nozzle of the additional extrusion die.

Pursuant to another feature of the present invention, the co-extrusion die and the simple extrusion die, as well as the additional extrusion die, are each provided with a mounting plate having at opposite edges a pair of oppositely inclined beveled surfaces. The co-extrusion apparatus is provided with a securing mechanism engageable with the beveled surfaces for locking the respective die to the co-extrusion apparatus at the outlets thereof. The steps of detachably fastening the co-extrusion die and removably attaching the simple extrusion die (as well as the step of attaching the additional extrusion die) to the co-extrusion apparatus include the manipulation of the securing mechanism to engage the beveled surfaces of the respective die. The step of removing the co-extrusion die (and the step of removing the simple extrusion die) includes the manipulation of the securing mechanism to disengage the same from the beveled surfaces of the co-extrusion die (or the simple extrusion die).

Another feature of the present invention relates to the structure of the simple extrusion die utilizable in a co-extrusion apparatus having a pair of juxtaposed extruder outlets and a coupling mechanism for securing the co-extrusion die to the co-extrusion apparatus at the outlets thereof. In accordance with the invention, the simple extrusion die comprises a nozzle, a mounting plate and engagement means on the mounting plate for cooperating with the coupling mechanism of the co-extrusion apparatus to secure the simple extrusion die thereto. The mounting plate is attached to the nozzle and is provided with a single eccentrically disposed opening communicating on one side with the nozzle. Upon the attachment of the mounting plate to the co-extrusion apparatus, the opening communicates on another side with one of the outlets of the co-extrusion apparatus, while the mounting plate blocks the other outlet.

The engagement means is preferably symmetrically formed on the mounting plate of the simple extrusion die, whereby the die may be attached to the co-extrusion apparatus so that the nozzle communicates via the opening in the mounting plate with either one of the two extruder outlets. The coupling mechanism on the co-extrusion apparatus may comprise a pair of bracket members each having a first beveled contact surface, the engagement means on the mounting plate concomitantly comprising two second beveled contact surfaces at opposite edges of the mounting plate. Each of the second beveled contact surfaces are engageable with a respective first beveled contact surface of the bracket members.

A method in accordance with the present invention for operating a co-extrusion apparatus is particularly advantageous in a geographical area in which continuous operation of the apparatus in a co-extrusion mode for more than one labor shift a day is not warranted by the consumption within that geographical area of a kind of cookie having dissimilar inner and outer portions. Upon production of a predetermined number of cookies adapted to the level of consumption in the geographical area serviced by the co-extrusion apparatus, the apparatus may be easily and quickly modified to produce cookies made of a single material (i.e., a dough). The modification is implemented by substituting a simple extrusion die for a co-extrusion die at the outlets of the apparatus. Because an exchange of the dies may be accomplished with a few minutes, the machine is quickly prepared to produce a simple extrudate consisting of a dough material which formed either the inner or outer portion of the previously produced cookies having an inner portion enveloped by a dissimilar outer portion. While the co-extruder is being operated to produce a simple extrudate, the hopper and its associated feeding mechanism which are not being used can be cleaned and prepared for accommodating a different material.

In a method according to the present invention, a co-extruder may be first operated to produce a first cookie having dissimilar inner and outer portions, then operated to produce a second cookie made of the material comprising the outer portion of the first cookie, and subsequently operated to produce a third cookie having an inner portion of a material different from that of the inner portion of the first cookie and an outer portion of the material forming the outer portion of the first cookie. The amount of down time, i.e., time that the machine is not running, is reduced to a minimum, only a few minutes being required to exchange extrusion dies between each operating cycle.

Similarly, the co-extruder may be initially operated to produce a rope-like co-extrudate, then operated to form a simple extrudate of a first material, subsequently operated to produce another simple extrudate of a second material, and finally operated to extrude the previously produced co-extrudate or another co-extrudate. The same or another operating sequence may then be performed. While the co-extruder is being operated in a simple extrusion mode, the hopper and the feeder mechanism which are not being utilized may be cleaned in preparation for receiving a new dough or other material.

DETAILED DESCRIPTION

Figure 1:
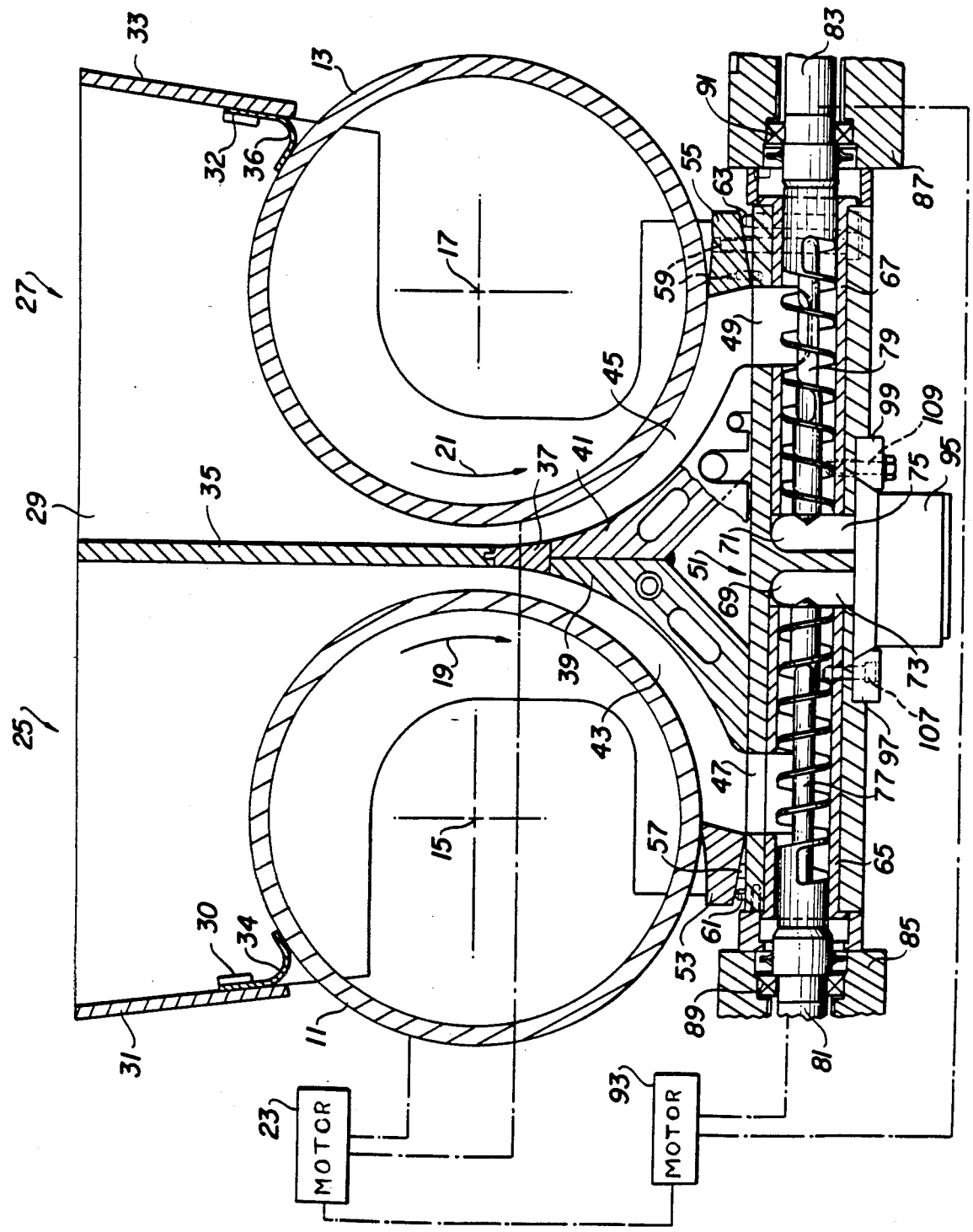
FIG. 1 is a transverse cross-sectional view of a co-extrusion apparatus having a co-extrusion die attached thereto.

As illustrated in FIG. 1, a co-extrusion apparatus comprises a pair of cylindrical drums 11 and 13 mounted to a frame (not illustrated) for rotation about respective parallel axes 15 and 17 in directions indicated by arrows 19 and 21. A motor 23 is operatively connected to drums 11 and 13 by means of respective rotary power transmission trains whereby the rate of rotation of the drums may be separately varied.

The co-extrusion apparatus further includes a pair of hoppers 25 and 27 located above drums 11 and 13, respectively. The hoppers are formed in part by a pair of end plates 29 (only one shown in the drawing) disposed at opposite ends of counterrotatable drums 11 and 13. The drums are also formed in part by a pair of side plates 31 and 33 and an intermediate dividing plate 35. The side plates 31 and 33 are inclined at a slight angle with respect to the vertical, while the intermediate plate extends vertically midway between drums 11 and 13.

Side plates 31 and 33 are connected at their bottom ends by means of respective bolts or rivets 30 and 32 to a pair of wiping elements 34 and 36 each having an end engaging the outer surface of a respective drum 11 and 13 for closing the space between the respective side plate 31 and 37 and the respective drum 11 and 13.

At its bottom edge, intermediate plate 35 is connected via a coupling member 37 to a pair of curved guide members 39 and 41. Members 37, 39 and 41 all extend parallel to the axes of rotation 15 and 17 of drums 11 and 13. Intermediate plate 35, coupling member 37, and guide members 39 and 41 cooperate with the cylindrical outer surfaces of drums 11 and 13 to define a pair of passageways 43 and 45 extending from hoppers 25 and 27, respectively, to a pair of apertures 47 and 49 formed in the upper surface of an auger housing 51.

At the lower ends of passageways 43 and 45 are disposed a pair of scraper members 53 and 55 each having a scraping edge engaging the outer surface of a respective drum 11 and 13 and an additional edge engaging an upper surface of auger housing 51 proximate to a respective aperture 47 and 49 therein. Scraper members 53 and 55 are attached to auger housing 51 by means of respective bolts 57 and 59, further bolts 61 and 63 being provided for adjusting the angles of inclination of the scraper members with respect to the upper surface of the auger housing and with respect to the outer surface of drums 11 and 13.

Auger housing 51 is provided with a pair of substantially colinear bores each lined with a respective sleeve 65 and 67. The colinear bores in auger housing 51 terminate in respective transversely extending vertical bores 69 and 71 which define at their lower ends a pair of oval output ports or outlets 73 and 75.

Rotatably mounted within each sleeve 65 and 67 is a respective auger or worm 77 and 79. Augers 77 and 79 form extensions of a pair of drive shafts 81 and 83 rotatably mounted within respective support members 85 and 87 by means of respective ball or roller bearings 89 and 91. A motor 93 is operatively coupled to drive shafts 81 and 83 by means of a pair of rotary power transmission trains by which the angular velocity of augers 77 and 79 may be independently varied. Motors 23 and 93 may be operatively coupled to, e.g., a programmer device (not illustrated) for controlling the angular speeds of augers 77 and 79 and of drums 11 and 13 with respect to each other.

Figure 2:
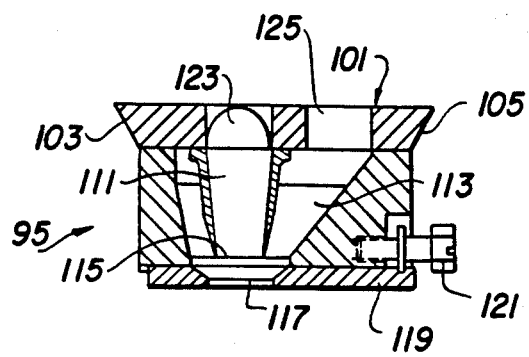
FIG. 2 is a cross-sectional view of the co-extrusion die illustrated in FIG. 1.

In a co-extrusion mode of operation of the device illustrated in FIG. 1, a co-extrusion die 95 is fastened to the bottom side of auger housing 51 by means of a pair of mounting brackets 97 and 99. As illustrated in FIG. 2, co-extrusion die 95 includes a mounting plate 101 provided at a pair of opposite sides or edges with a pair of oppositely inclined beveled surfaces 103 and 105. Beveled surfaces 103 and 105 are engageable by inclined surfaces on brackets 97 and 99, respectively, as illustrated in FIG. 1. Brackets 97 and 99 are secured to auger housing 51 by respective pluralities of bolts 107 and 109.

As illustrated in FIG. 2 and described in co-pending U.S. patent application Ser. No. 630,126, filed July 12, 1984, co-extrusion die 95 includes an inner nozzle 111 and a outer nozzle 113, the outer nozzle being formed by the body or housing of die 95. Inner nozzle 111 has an outlet or orifice 115 spaced inwardly from an outlet or orifice 117 of outer nozzle 113. Orifice 117 of outer nozzle 113 is provided in a plate 119 fastened to the bottom of the die at a horizontal position with respect thereto determined by an adjustment bolt 121. A rope-like co-extrudate material produced by the co-extruder of FIG. 1 with the co-extrusion die of FIG. 2 is deposited on a horizontally moving conveyor (not illustrated) below the co-extrusion die and is transported by the conveyor to a cutting station and from thence to an oven. Because the side of the rope-like co-extrudate contacting the conveyor is placed in tension during the depostion of the co-extrudate on the conveyor, while the opposite side of the co-extrudate is compressed, it is advantageous to adjust the horizontal position of orifice 117 with respect to orifice 115 to ensure that the material forming the outer tube of the co-extrudate is in greater abundance on the side thereof contacting the conveyor than on the opposite side.

Mounting plate 101 is provided with a pair of openings 123 and 125 which communicate on one side with outlets 73 and 75, respectively, and on an opposite side with nozzles 111 and 113, respectively.

Figure 3:
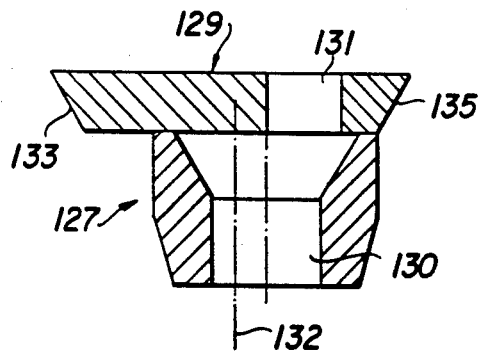
FIG. 3 is a cross-sectional view, on an enlarged scale, of a simple extrusion die substitutable for the co-extrusion die of FIG. 2 in the co-extruder assembly of FIG. 1.

As illustrated in FIG. 3, a simple extrusion die 127 utilizable in a method of operating a co-extrusion apparatus in accordance with the present invention comprises a mounting plate 129 and a single nozzle 130. The mounting plate is provided with an eccentrically disposed opening 131 which communicates on one side with outlet 75 of auger housing 51 and on an opposite side with nozzle 130 upon a mounting of die 127 to the lower side of auger housing 51. Upon such a fastening of die 127 to auger housing 51, mounting plate 129 covers outlet 73 and thereby blocks material from passing through that outlet.

Extrusion die 127 is advantageously formed in such a way that, upon a 180° rotation of the die about a longitudinal axis 132 and upon the attachment of the die to the lower face of the auger housing, nozzle 130 communicates with outlet 73 via opening 131 and mounting plate 129 covers outlet 75 and thereby blocks the passage of material therethrough.

Figure 4:
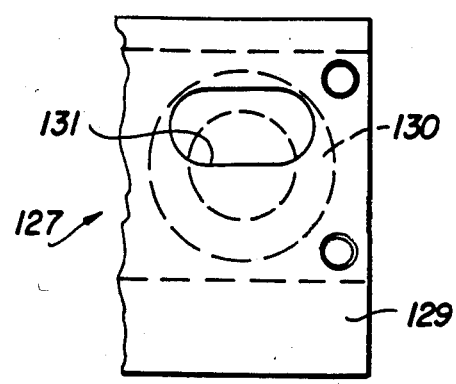
FIG. 4 is a top view of the simple extrusion die of FIG. 3.

As illustrated in FIG. 4, opening 131 may take an oval shape to conform to the shape of outlets 73 and 75. It is to be noted that a co-extruder of the type illustrated in FIG. 1 is generally provided with a multiplicity of equi-spaced worm assemblies each including a pair of oppositely facing augers for feeding semi-solid material from respective apertures (such as apertures 47 and 49) to respective outlets (such as outlets 73 and 75). In such an apparatus, there may be provided a plurality of equi-spaced extrusion dies (e.g., die 95 or die 127) rigid with a common mounting plate securable to the lower face of auger housing 51 by means of a pair of elongate brackets (e.g., 97 and 99) extending parallel to the axes of rotation 15 and 17 of drums 11 and 13. Although drums 11 and 13 are shown to be hollow in FIG. 1, it is advantageous in many cases to use solid cylinders.

In a co-extrusion mode of operation, drums 11 and 13 are operated by motor 23 to counterrotate in the directions of arrows 19 and 21, thereby drawing material from hoppers 25 and 27 through passageways 43 and 45 to apertures 47 and 49, Augers 77 and 79 then force the material through the horizontal bores of auger housing 51 to the transversely extending bores 69 and 71. The material from hopper 25 and the material from hopper 27 then flow through outlets 73 and 75, openings 123 and 125, nozzles 111 and 113, and orifices 115 and 117. As described in U.S. patent application Ser. No. 630,126, a rope-like co-extrudate is produced at orifice 117. The inner core of the co-extrudate is formed from one material, a supply of which is stored in hopper 25, while the outer tube surrounding the inner core is formed from a second material, a supply thereof being stored in hopper 27.

In accordance with the method of the present invention, upon the production of a predetermined length of co-extrudate, the rotation of drums 11 and 13, as well as the turning of augers 77 and 79, is stopped. Bracket 99 is then unbolted from auger housing 51 and die 95 is removed from the co-extrusion apparatus. Then drum 11 and auger 77 may be temporarily operated to empty hopper 25, passageway 43, sleeve 65 and bore 69 of the material forming the inner core of the co-extrudate. Upon the stopping of drum 11 and auger 77, simple extrusion die 127 may be placed against the bottom surface of auger housing 51 so that a beveled surface 133 of mounting plate 129 engages the corresponding inclined surface of bracket member 97. Bracket member 99 is then bolted into position so that the inclined surface thereof contacts an inclined surface 135 on mounting plate 129.

Upon the attachment of the simple extrusion die 127 to the co-extrusion apparatus so that nozzle 130 communicates with outlet 75, drum 12 and auger 79 are operated to feed the material disposed in hopper 27 through passageway 45, aperture 49, sleeve 67, bore 71, outlet 75, and opening 131 to nozzle 130. In this way the co-extrusion apparatus may be used in a simple extrusion mode to produce a rope-like extrudate formed of a single material.

During the operation of the co-extrusion apparatus in a simple extrusion mode, the portion of the apparatus associated with the drum 11 may be at least partially cleaned. For example, auger 77 can be removed from sleeve 75 and water subsequently flushed through hopper 75, passageway 43, aperture 47 and sleeve 65. Alternatively, other parts of the co-extrusion apparatus, such as side plate 31 and drum 11 may be temporarily removed to facilitate cleaning operations.

Upon the cleaning of that portion of the apparatus associated with drum 11 and upon the operation of the apparatus in the simple extrusion mode for a predetermined period of time (producing a predetermined length of extrudate), the rotation of drum 13 and auger 79 is stopped and simple extrusion die 127 is replaced by co-extrusion die 95. The co-extrusion apparatus may then be operated again in the co-extrusion mode, with a different material in hopper 25 than was stored there during the previous co-extrusion operation.

Thus, in accordance with the method of the present invention, a co-extruder may be operated during a first predetermined interval of time to produce a predetermined length of a first co-extrudate. The co-extrudate may comprise an outer tube of a first material such as dough and an inner core of a second material such as fruit filling. During a second interval of operation, the co-extruder is operated to produce an extrudate consisting of the dough material which formed the outer tube of the co-extrudate during the first interval of operation. During a third operating interval, the co-extruder functions to produce a co-extrudate having a doughy outer shell and an inner core formed, for example, of a dough containing particulate matter such as chocolate chips or nut fragments.

It is clear that a co-extruder may be operated in accordance with the present invention so that any two intervals of operation in the co-extrusion mode are separated by one or more intervals of operation in a simple extrusion mode. In addition, if the materials of the inner core and outer tube of the co-extrudates produced during the two intervals of co-extrusion operation are identical, it would not be necessary to empty and clean the hopper and the associated feeding mechanism which are not being used during the simple extrusion mode of operation.

Although the invention as been described in terms of specific embodiments and applications, persons skilled in the art, in light of this teaching, can generate additional embodiments without exceeding the scope or departing from the spirit of the claimed invention. Accordingly, it is to be understood that the drawings and descriptions in this disclosure are proffered to facilitate comprehension of the invention and should not be construed to limit the scope thereof.

What is claimed is:

1. A method for using a co-extrusion apparatus including a first hopper for containing a supply of a first material and a second hopper for containing a supply of a second material, said co-extrusion apparatus further including first means for feeding said first material from said first hopper to a first outlet and second means for feeding said second material from said second hopper to a second outlet proximate to said first outlet, said method comprising the steps of:
   providing a co-extrusion die having an inner nozzle and an outer nozzle surrounding said inner nozzle;
   detachably fastening said co-extrusion die to the co-extrusion apparatus so that said inner nozzle communicates with the first outlet and said outer nozzle communicates with the second outlet;
   operating said co-extrusion apparatus to produce a rope-like co-extrudate having a core formed of the first material and a tube-like outer layer formed of the second material and surrounding said core;
   removing said co-extrusion die from said co-extrusion apparatus;
   providing a simple extrusion die with a single nozzle;
   removably attaching said simple extrusion die to said co-extrusion apparatus so that said single nozzle communicates with one of said first and said second outlet and so that said simple extrusion die blocks the other of said first and said second outlet to prevent the passage of the respective material therethrough;
   operating said co-extrusion apparatus to produce a rope-like simple extrudate formed of a single material contained in the hopper associated with said one of said first and said second outlet;
   cleaning the hopper and the means for feeding associated with said other of said first and second outlet, said step of cleaning being performed at least in part during execution of said step of operating said co-extrusion apparatus to produce a rope-like simple extrudate.

2. The method defined in claim 1 wherein said second material is a dough.

3. The method defined in claim 2 wherein at least one of said first and said second material contains particulate matter.

4. The method defined in claim 3 wherein said first material is a dough.

5. The method defined in claim 2 wherein said first material is a dough.

6. The method defined in claim 2 wherein said single material consists of said second material.

7. The method defined in claim 1, further comprising the steps of detaching said simple extrusion die from said co-extrusion apparatus, providing an additional extrusion die with a single nozzle, disconnectably coupling said additional extrusion die to said co-extrusion apparatus so that the nozzle of said additional extrusion die communicates with said other of said first and said second outlet and so that said additional extrusion die blocks said one of said first and said second outlet to prevent the passage therethrough of material located in the hopper associated with said one of said first and said second outlet, and operating said co-extrusion apparatus to produce a rope-like additional extrudate formed of a single material contained in the hopper associated with said other of said first and said second outlet.

8. The method defined in claim 1 wherein said co-extrusion die and said simple extrusion die are each provided with a mounting plate having at opposite edges a pair of oppositely inclined beveled surfaces, said co-extrusion apparatus being provided with securing means engageable with said beveled surfaces for locking the respective die to said co-extrusion apparatus at said first and said second outlet, said securing means being manipulated, during said steps of detachably fastening and removably attaching, to engage said beveled surfaces of the respective die, said securing means being manipulated to disengage said beveled surfaces of said co-extrusion die during said step of removing.

* * * * *